US011753797B2

(12) United States Patent
Tanigawa et al.

(10) Patent No.: US 11,753,797 B2
(45) Date of Patent: Sep. 12, 2023

(54) WORKING VEHICLE

(71) Applicant: KUBOTA CORPORATION, Osaka (JP)

(72) Inventors: Takuya Tanigawa, Sakai (JP); Kenichi Aoyama, Sakai (JP); Michitaka Tanaka, Sakai (JP); Hitoshi Omachi, Sakai (JP); Megumi Sawai, Sakai (JP); Daisuke Inaba, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 209 days.

(21) Appl. No.: 17/236,042

(22) Filed: Apr. 21, 2021

(65) Prior Publication Data

US 2021/0332557 A1    Oct. 28, 2021

(30) Foreign Application Priority Data

Apr. 28, 2020  (JP) ................. 2020-078843

(51) Int. Cl.
| | |
|---|---|
| *B60K 23/02* | (2006.01) |
| *E02F 9/20* | (2006.01) |
| *F16D 23/12* | (2006.01) |
| *B62D 33/06* | (2006.01) |
| *E02F 9/16* | (2006.01) |

(52) U.S. Cl.
CPC .......... *E02F 9/2004* (2013.01); *B60K 23/02* (2013.01); *B62D 33/0617* (2013.01); *F16D 23/12* (2013.01); *B60Y 2200/221* (2013.01); *B62D 33/0604* (2013.01); *E02F 9/16* (2013.01); *F16D 2023/126* (2013.01)

(58) Field of Classification Search
CPC .......... G05G 1/46; B60K 23/02; F16D 23/12; F16D 2023/126
See application file for complete search history.

(56) References Cited

U.S. PATENT DOCUMENTS

| | | | | |
|---|---|---|---|---|
| 3,368,426 A | * | 2/1968 | Erhardt | ................. B60W 10/18 477/47 |
| 3,448,842 A | * | 6/1969 | Nordstrom | .............. F16D 25/14 192/85.14 |
| 3,498,433 A | | 3/1970 | Lohmann | |
| 4,337,854 A | * | 7/1982 | Oxley | ................... B60W 10/18 74/26 |
| 4,717,002 A | * | 1/1988 | Sasamura | ............... F16D 25/14 192/70.24 |

(Continued)

FOREIGN PATENT DOCUMENTS

| | | |
|---|---|---|
| CN | 202338631 U | 7/2012 |
| JP | 05-1724 A | 1/1993 |
| KR | 10-2019-0024289 A | 3/2019 |

*Primary Examiner* — Richard W Ridley
*Assistant Examiner* — Brian J McGovern
(74) *Attorney, Agent, or Firm* — KEATING AND BENNETT, LLP

(57) ABSTRACT

A working vehicle includes a vehicle body, a cabin on the vehicle body, a clutch pedal in the cabin, a clutch on the vehicle body, a clutch operator to engage and disengage the clutch, a linkage including first and second ends, the first end being connected to the clutch operator, and a linkage lock to interlock the clutch pedal with the second end of the linkage so that vibrations of the cabin are reduced or prevented from being transmitted to the clutch.

5 Claims, 13 Drawing Sheets

(56) References Cited

U.S. PATENT DOCUMENTS

| | | | | |
|---|---|---|---|---|
| 5,435,425 A | * | 7/1995 | Ijames | F16D 65/123 |
| | | | | 188/218 XL |
| 6,321,893 B1 | * | 11/2001 | Muhlert | G05G 1/30 |
| | | | | 180/315 |
| 9,110,493 B2 | * | 8/2015 | Legler | G05G 1/44 |
| 2004/0016618 A1 | * | 1/2004 | Bender | F16D 23/12 |
| | | | | 192/85.48 |
| 2006/0096825 A1 | * | 5/2006 | Woehrle | F16F 7/108 |
| | | | | 192/99 S |
| 2007/0137964 A1 | * | 6/2007 | Kummer | F16D 67/00 |
| | | | | 192/13 R |
| 2011/0031088 A1 | * | 2/2011 | Settles | F16D 65/12 |
| | | | | 192/18 R |

* cited by examiner

WORKING VEHICLE

CROSS REFERENCE TO RELATED APPLICATIONS

The present application claims priority under 35 U.S.C. § 119 to Japanese Patent Application No. JP2020-078843, filed Apr. 28, 2020. The entire contents of this application are hereby incorporated herein by reference.

BACKGROUND OF THE INVENTION

1. Field of the Invention

The present invention relates to a working vehicle such as a tractor.

2. Description of the Related Art

The working vehicle disclosed in Japanese Unexamined Patent Application Publication No. H05-1724 is commonly known.

The working vehicle disclosed in Japanese Unexamined Patent Application Publication No. H05-1724 includes a vehicle body and a cabin mounted on the vehicle body. The vehicle body is provided with a clutch that connects and disconnects the power transmission of a traveling power transmission device. The clutch is engaged and disengaged by a clutch operation member constituted of a clutch lever and a release fork. A clutch pedal is provided in the cabin to operate the clutch operation member to engage and disengage the clutch. The clutch operation member and the clutch pedal are interlocked with each other by a linkage member.

SUMMARY OF THE INVENTION

A working vehicle according to one aspect of an example preferred embodiment of the present invention includes a vehicle body, a cabin on the vehicle body, a clutch pedal in the cabin, a clutch, a clutch operator to engage and disengage the clutch, a linkage including first and second ends, the first end of the linkage being connected to the clutch operator, and a linkage lock to interlock the clutch pedal with the second end of the linkage so that vibrations of the cabin are reduced or prevented from being transmitted to the clutch.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
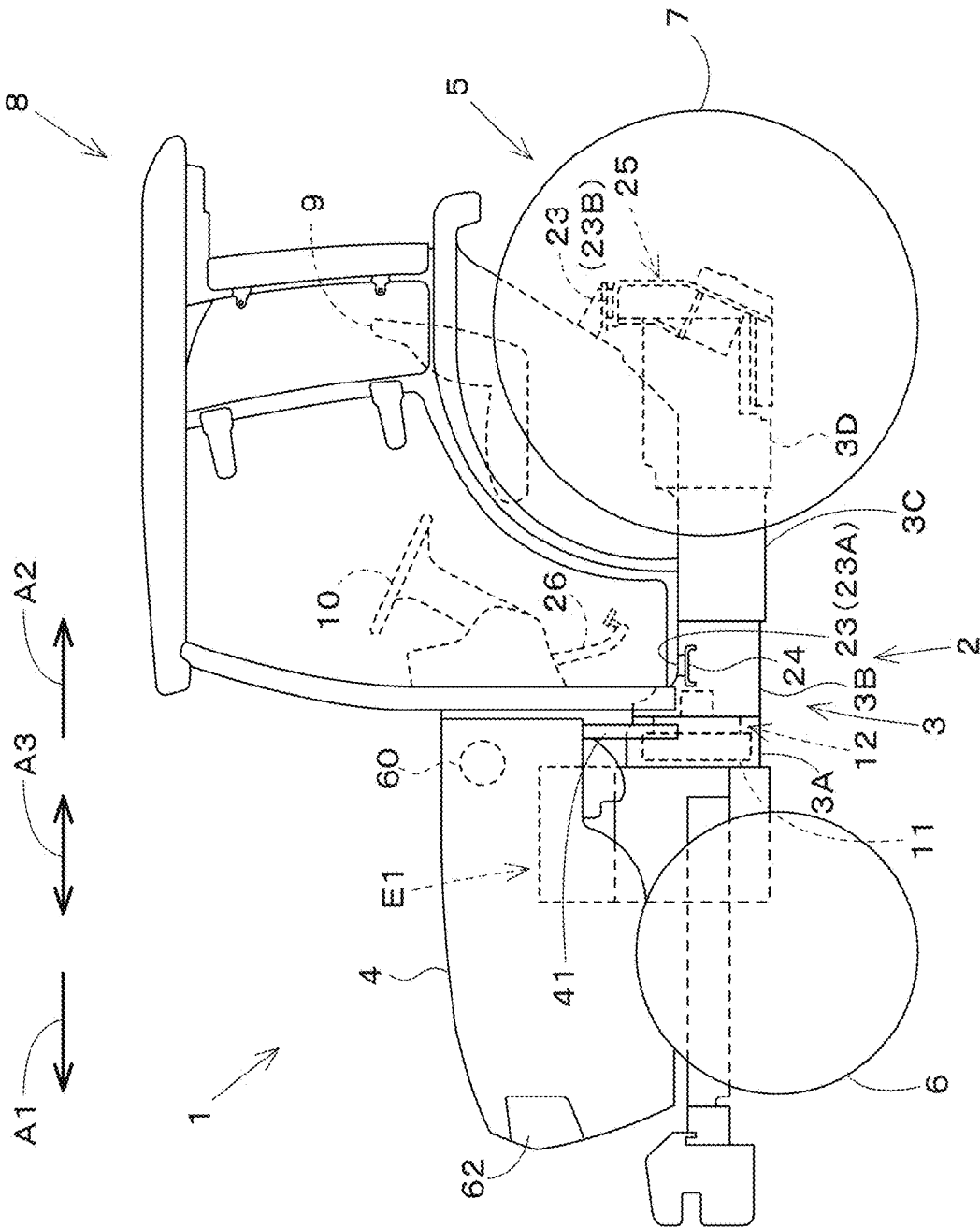
FIG. 1 is a side view of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

FIG. 1 shows a schematic side view of the overall configuration of a working vehicle 1 according to a preferred embodiment of the present invention. In the present preferred embodiment, a tractor is exemplified as the working vehicle 1. The working vehicle 1 may be another travelable working vehicle such as a wheel loader or a backhoe.

In the description of the preferred embodiments, a direction of an arrowed line A1 in FIG. 1 (a forward-traveling direction of the working vehicle 1) is referred to as the front, a direction of an arrowed line A2 in FIG. 1 (a rearward-traveling direction of the working vehicle 1) is referred to as the rear, and a direction of an arrowed line A3 in FIG. 1 is referred to as a fore-and-aft direction. Accordingly, a front surface side of FIG. 1 is the left, and the back surface side of FIG. 1 is the right. In addition, the horizontal direction perpendicular to the fore-and-aft direction A3 is referred to as a vehicle width direction. In the working vehicle 1, the direction extending from the center portion to the left portion and the direction extending from the center portion to the right portion are each referred to as an outward direction in the vehicle width direction. In other words, the outward direction in the vehicle width direction corresponds to the vehicle width direction and is a direction separating from the center of the working vehicle 1. A direction opposite to the outward direction in the vehicle width direction is described as an inward direction in the vehicle width direction. In other words, the inward direction in the vehicle width direction corresponds to the vehicle width direction and is a direction approaching the center of the working vehicle 1.

As shown in FIG. 1, the working vehicle 1 includes a vehicle body (or a machine body) 2 capable of traveling. The vehicle body 2 includes a prime mover E1 and a transmission case 3 connected to the rear portion of the prime mover E1.

The prime mover E1 is a diesel engine. The prime mover E1 is located at the front portion of the working vehicle 1 and is covered by a hood 4. The prime mover E1 may be an electric motor, or may be a hybrid type including a diesel engine and an electric motor. The transmission case 3 includes, for example, a flywheel housing 3A, a clutch housing 3B, a transmission case 3C, and a differential case 3D which are directly connected to each other.

Figure 2:
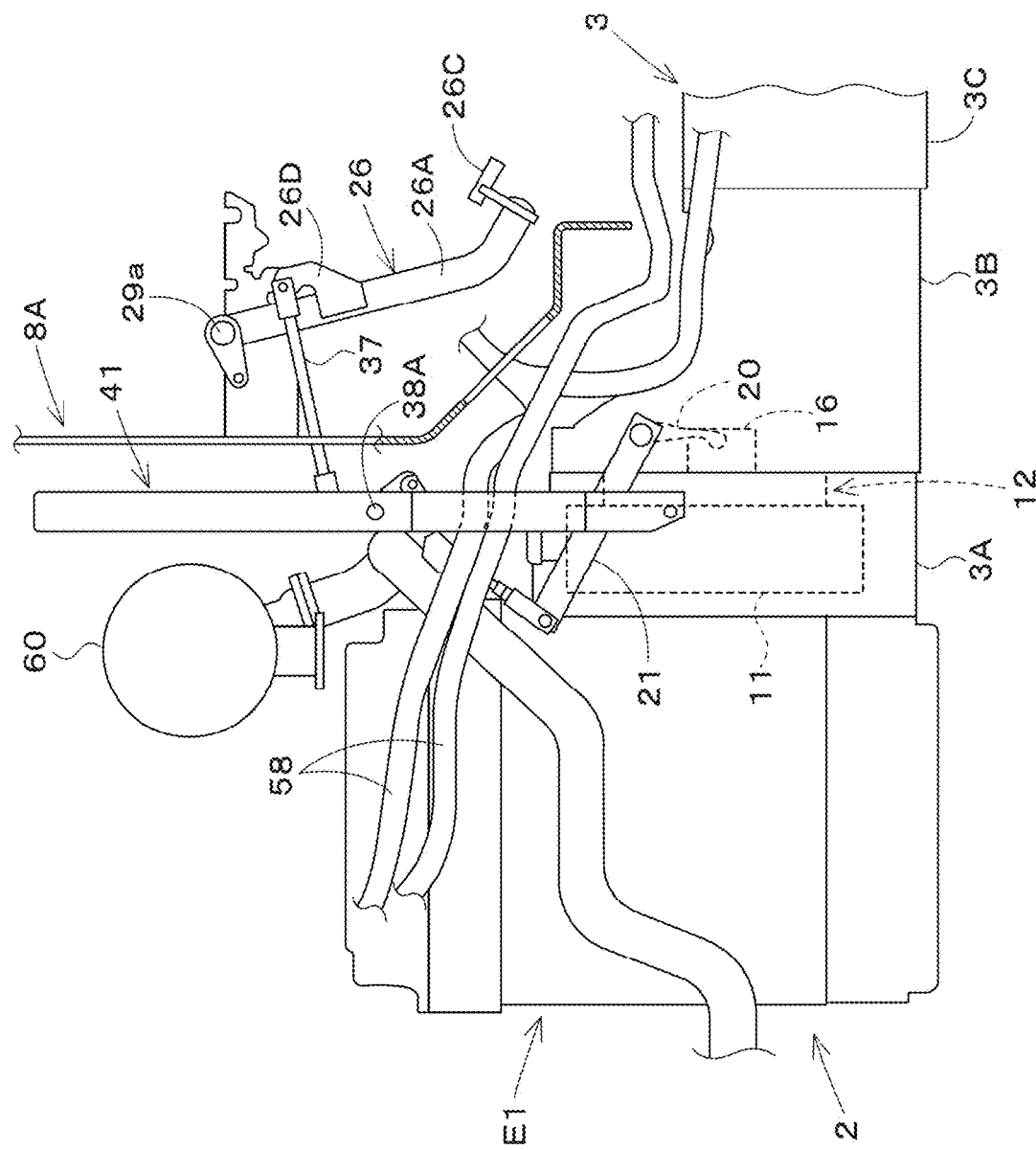
FIG. 2 is a side view of a front portion of the working vehicle.

As shown in FIGS. 1 and 2, the flywheel housing 3A is a case that houses the flywheel 11 configured to be rotated by the power output from the prime mover E1. The clutch housing 3B is a case that houses the clutch 12 configured to cut or connect transmission of the power of the prime mover E1 transmitted through the flywheel 11. The transmission case 3C is a case that houses a transmission device (not shown) configured to shift the power transmitted through the clutch 12. The differential case 3D is a case that houses a differential device (not shown) configured to transmit the power from the transmission device to rear wheels 7 to be described later.

Figure 3:
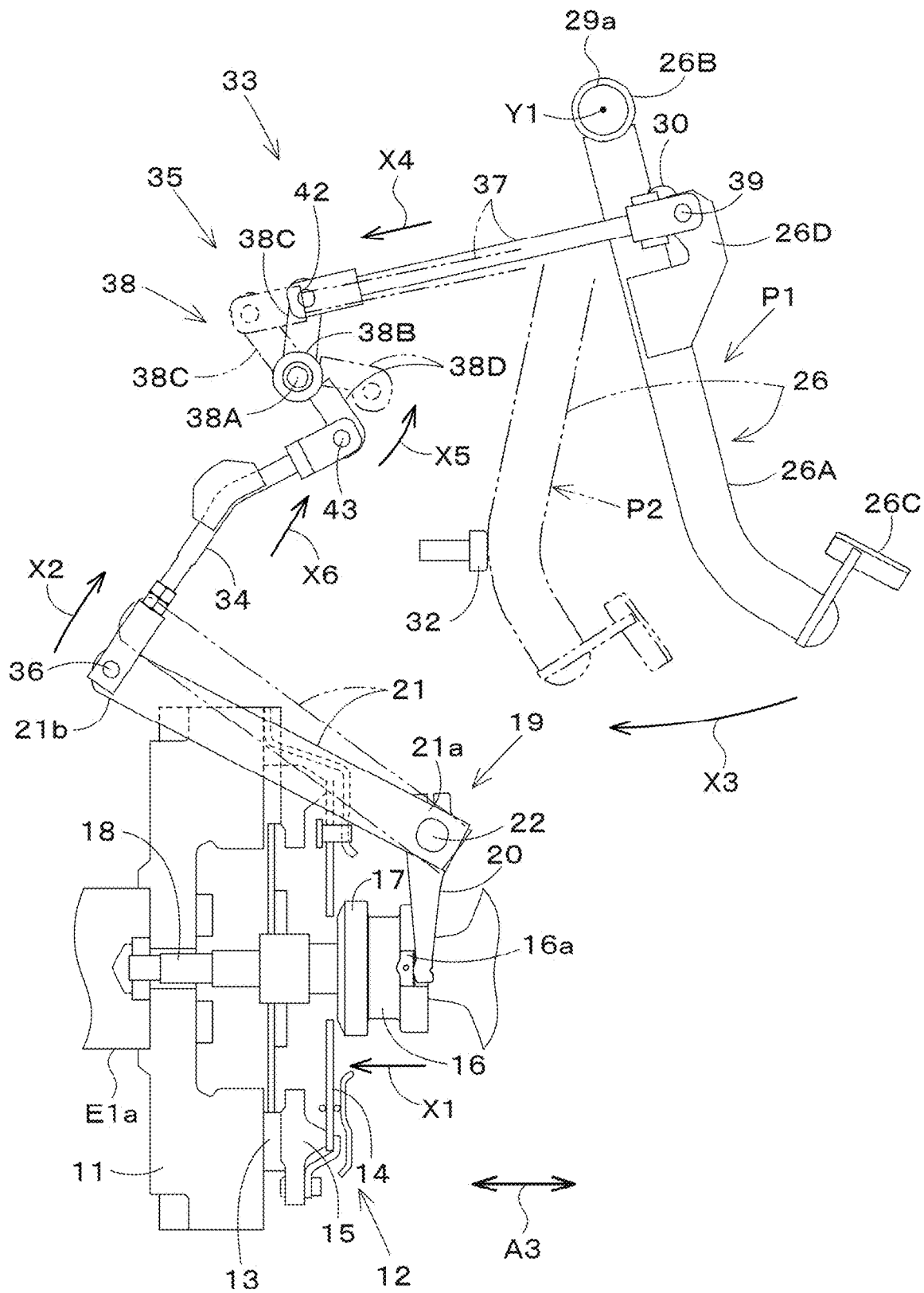
FIG. 3 is an overall side view of a mechanism for interlocking a clutch and a clutch pedal.

As shown in FIG. 3, the flywheel 11 is connected to an output shaft E1a of the prime mover E1. The clutch 12 includes a clutch disc 13, a diaphragm spring 14, a pressure plate 15, a sleeve 16, and a release bearing 17.

The clutch disc 13 drivingly connects to a transmission shaft 18 that transmits power to the transmission device in the transmission case 3C. The diaphragm spring 14 presses the clutch disc 13 mounted on the transmission shaft 18 against the flywheel 11 with the pressure plate 15 when the clutch 12 is engaged. In this manner, the output shaft E1a of the prime mover E1 is drivingly connected to the transmission shaft 18 so as to allow the power from the prime mover E1 to be transmitted to the transmission device.

The sleeve 16 is supported on the transmission shaft 18 slidably in the fore-and-aft direction A3. When the clutch 12 is disengaged, the sleeve 16 moves forward in the direction of an arrowed line X1 toward the diaphragm spring 14, and the sleeve 16 presses the release bearing 17 against the diaphragm spring 14. This causes the diaphragm spring 14 to be warped and then the clutch disc 13 to be separated from the flywheel 11 so that the output shaft E1a of the prime mover E1 is disconnected from the transmission shaft 18. That is, the power transmission to the transmission device is cut.

The clutch 12 is engaged and disengaged in operation by the clutch operation member 19 shown in FIG. 3. The clutch operation member 19 includes a release fork 20 and a clutch lever 21. The release fork 20 includes an upper portion attached to a lever shaft 22 that is provided on the clutch housing 3B, and a lower portion engaged with an engagement portion 16A of the sleeve 16. The clutch lever 21 includes a first end 21a and a second end 21b defined as opposite axial ends thereof. The first end 21a of the clutch lever 21 is attached to the lever shaft 22, and the clutch lever 21 extends upwardly forward from the first end 21a on the lever shaft 22 to the second end 21b. The release fork 20 and the clutch lever 21 are integrally rotatable around the axis of the lever shaft 22 with respect to the clutch housing 3B. Accordingly, when the second end 21b of the clutch lever 21 is pulled up in the direction of an arrowed line X2 from an engaging state of the clutch 12 shown in FIG. 3, the lever shaft 22 is rotated, and the release fork 20 is swung forward so that a lower portion of the release fork 20 moves toward the diaphragm spring 14. When the release fork 20 swings forward, the sleeve 16 moves toward the diaphragm spring 14, and then the clutch 12 is disengaged.

When the pulling-up force of the clutch lever 21 is released, the diaphragm spring 14 returns the sleeve 16 to its original position, the release fork 20 and the clutch lever 21 also return to their original positions, and thus the clutch 12 is engaged.

As shown in FIG. 1, the working vehicle 1 includes a traveling device 5 that supports the vehicle body 2 to allow the working vehicle 1 to travel. A wheel-type traveling device is exemplified as the traveling device 5, and includes right and left front wheels 6 provided on a front portion of the vehicle body 2 on which the prime mover E1 is mounted and right and left rear wheels 7 provided on a rear portion of the vehicle body 2 defined as the differential case 3D.

As shown in FIG. 1, the working vehicle 1 includes a cabin 8 mounted on the vehicle body 2 (more specifically, on the portion of the vehicle body 2 defined as the transmission case 3). The cabin 8 includes the front and rear portions supported on the vehicle body 2 in an anti-vibration manner with anti-vibration mounts (rubber mounts) 23 including front anti-vibration mounts 23A and rear anti-vibration mounts 23B. The front anti-vibration mounts 23A are located on right and left sides of the clutch housing 3B, and are attached to respective brackets 24 mounted on the clutch housing 3B. The rear anti-vibration mounts 23B are located on right and left sides of the lower back portion of the cabin 8, and are attached to respective brackets 25 mounted on the differential case 3D. A driver seat 9 on which an operator sits is provided at the rear portion of the interior of the cabin 8. In front of the driver seat 9, a steering wheel 10 to steer the front wheels 7 and a clutch pedal 26 by which the clutch 12 is operated from the interior side of the cabin 8 are provided, for example.

As shown in FIG. 2, the clutch pedal 26 is supported by a front wall 8A of the cabin 8. The front wall 8A is provided below a front windshield of the cabin 8, and also defines and functions as a separation wall supporting the steering wheel 10, a front console panel, various levers, and the like and separating the interior of the cabin 8 from the side on which the prime mover E1 is located.

Figure 4:
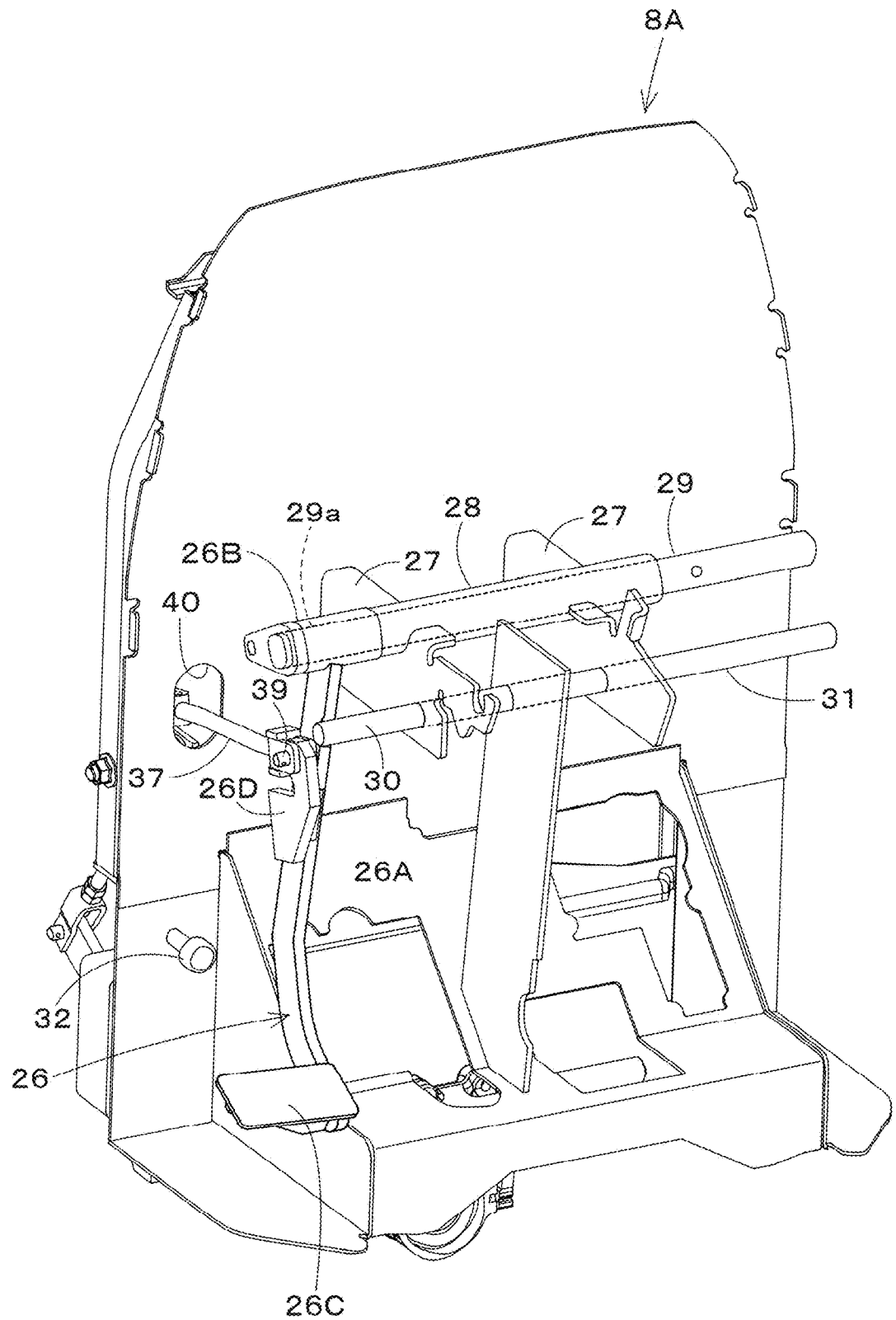
FIG. 4 is a perspective back view of the vicinity of the clutch pedal.

As shown in FIG. 4, a pair of shaft support brackets 27 are fixed to the back surface of the front wall 8A. A support cylinder 28 is fixed to the pair of shaft support brackets 27 so as to bridge over the pair of shaft support brackets 27. The support cylinder 28 has an axial center extending in the vehicle width direction. A shaft 29 is coaxially or substantially coaxially inserted into the support cylinder 28 and is fixed to the support cylinder 28 non-rotatably relative thereto. The shaft 29 includes a left portion protruding leftward from the support cylinder 28. The left portion of the shaft 29 is defined as a pedal shaft 29a that supports the clutch pedal 26.

The clutch pedal 26 has a suspended configuration, and includes a pedal arm 26A extending lengthwise in the vertical direction, a pivoting boss 26B fixed to an upper portion of the pedal arm 26A, a pedaling member 26C fixed to a lower portion of the pedal arm 26A, and a connecting stay 26D fixed to the upper portion of the pedal arm 26A. The pivoting boss 26B is provided on the outer periphery of the pedal shaft 29a so that the pivoting boss 26B can pivot around the axial center. That is, the clutch pedal 26 is supported by the pedal shaft 29a so as to be rotatable back and forth around the axial center Y1 of the pedal shaft 29a, as shown in FIG. 3.

The solid line in FIG. 3 shows a non-pedaling position P1 where the clutch pedal 26 is not pedaled, and the two-dot chain line in FIG. 3 shows a pedaling position P2 where the clutch pedal 26 is pedaled. The clutch pedal 26 is biased by a return spring (not shown) to swing in a return direction from the pedaling position P2 to the non-pedaling position P1. The swing of the clutch pedal 26 in the return direction is regulated by a first stopper 30. A bar 31 is fixed to the pair of shaft support brackets 27, and a left portion of the bar 31 is defined as the first stopper 30, as shown in FIG. 4. As shown in FIG. 3, the clutch pedal 26, when touching a second stopper 32, is restricted from further swinging in a pedaling direction indicated by an arrowed line X3. The second stopper 32 is fixed to the front wall 8A, as shown in FIG. 4.

As shown in FIG. 3, the clutch pedal 26 is interlocked with the clutch operation member 19 including the clutch lever 21 by an interlocking mechanism 33. The interlocking mechanism 33 includes a linkage member 34 and an interlocking linkage mechanism 35. The linkage member 34 includes a first end and a second end which are opposite axial ends thereof. The first end of the linkage member 34 is pivotally connected to the second end 21b of the clutch lever 21 via a pivot shaft 36. The linkage member 34 extends to its second end backwardly upward from its first end, i.e., the second end 21b of the clutch lever 21.

The interlocking linkage mechanism 35 interlocks the clutch pedal 26 with the second end of the linkage member 34 so that vibrations of the cabin 8 are prevented or reduced from being propagated to the clutch 12. This configuration reduces or prevents the "clutch judder phenomenon" in which the clutch 12 is repeatedly disengaged and engaged due to vertical vibration of the cabin 8 relative to the vehicle body 2.

As shown in FIG. 3, the interlocking linkage mechanism 35 includes an interlocking linkage 37 and an intermediate linkage 38. The interlocking linkage 37 includes first and second ends defined as opposite axial ends thereof. The first end of the interlocking linkage 37 is connected to the connecting stay 26D of the clutch pedal 26 with a pin 39 below the pedal shaft 29a. The interlocking linkage 37 extends forward from its first end connected to the connecting stay 26D. In particular, the interlocking linkage 37 extends to its second end slightly downwardly forward from its first end, i.e., the connecting stay 26D, and is pushed and pulled back and forth by the swing of the clutch pedal 26.

Figure 5:
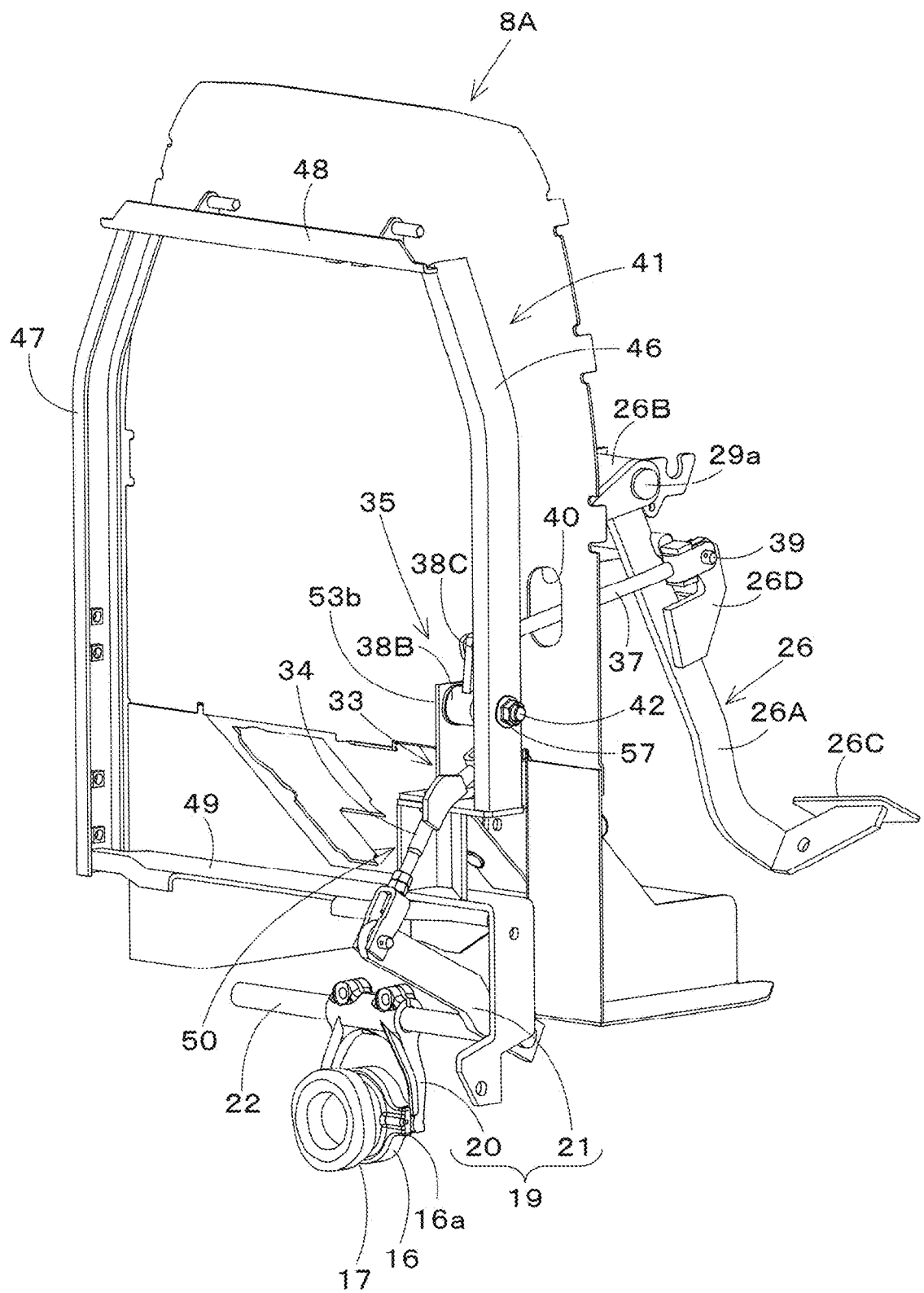
FIG. 5 is a perspective front view of the vicinity of the clutch pedal.

As shown in FIGS. 4 and 5, an insertion hole 40 is provided in the front wall 8A. The interlocking linkage 37 extends through the insertion hole 40 from the interior side of the cabin 8 to the side where the prime mover E1 is located.

As shown in FIG. 3, the intermediate linkage 38 is located in front of the front wall 8A (on the side where the prime mover E1 is located). The intermediate linkage 38 includes a linkage support shaft 38A, a pivoting boss 38B, a first linkage stay 38C, and a second linkage stay 38D. The linkage support shaft 38A is provided on the vehicle body 2. In particular, as shown in FIG. 2, the linkage support shaft 38A is attached to the support frame 41 that is attached to the flywheel housing 3A defined as a part of the vehicle body 2. The support frame 41 includes a lower portion attached to the flywheel housing 3A and protrudes upward from the flywheel housing 3A. The support frame 41 is located inside of the rear portion of the hood 4, and supports the hood 4 to allow the hood 4 to be pivoted up and down (to be opened and closed). The linkage support shaft 38A has an axial center extending in the vehicle width direction.

Figure 7:
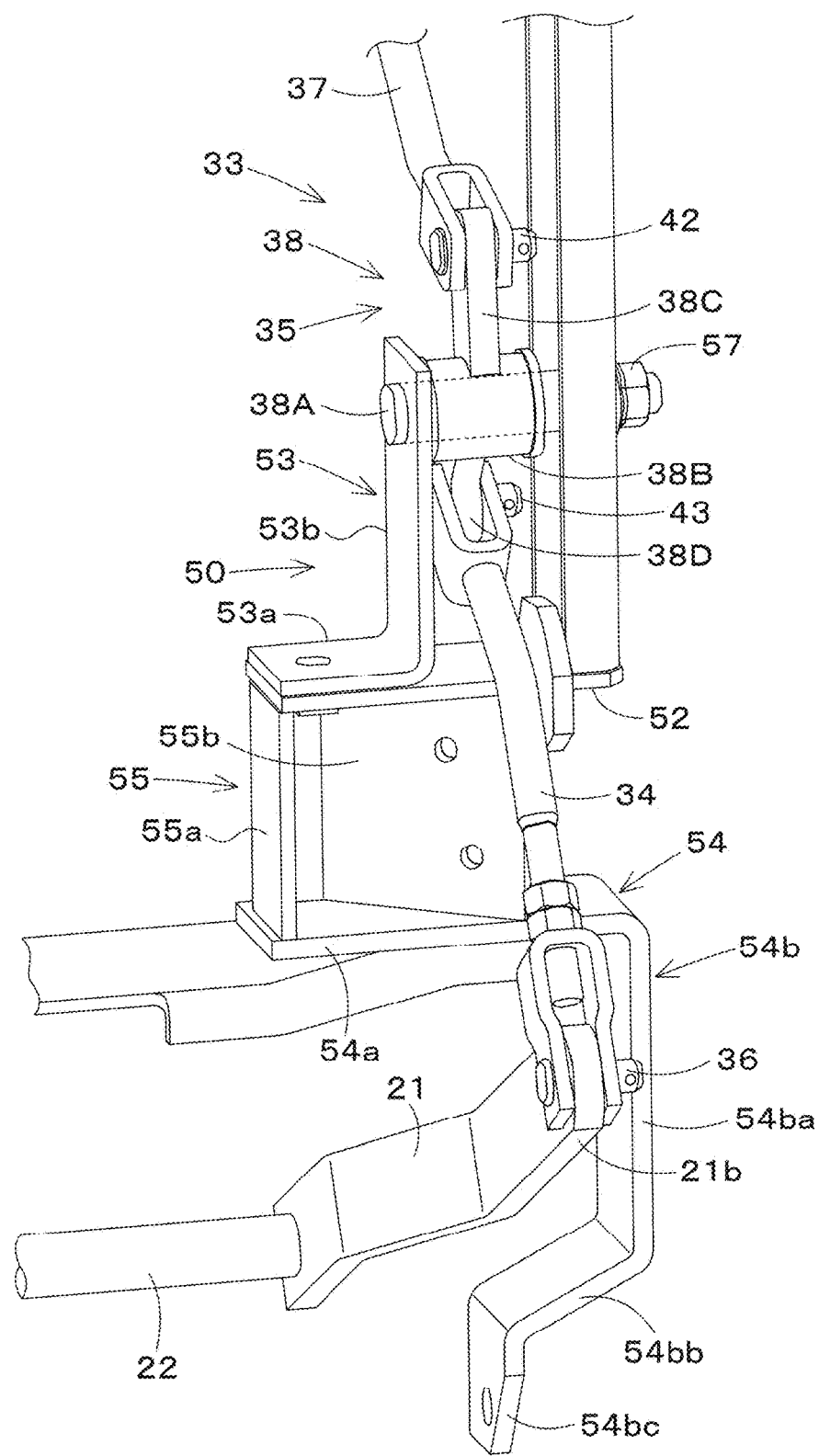
FIG. 7 is a perspective front view of an attachment portion of an intermediate linkage.

As shown in FIGS. 3 and 7, the linkage support shaft 38A axially extends outward in the vehicle width direction, and the pivoting boss 38B is provided on the outer periphery of the linkage support shaft 38A rotatably around the axial center of the linkage support shaft 38A. The first linkage stay 38C is fixed to the upper portion of the pivoting boss 38B, and protrudes upward from the pivoting boss 38B. The second end of the interlocking linkage 37 is connected to the first linkage stay 38C with a pivot shaft 42. In other words, the second end of the interlocking linkage 37 is connected to the first linkage stay 38C above the pivoting boss 38B. The second linkage stay 38D is fixed to the lower portion of the pivoting boss 38B, and protrudes downward from the pivoting boss 38B. In particular, the second linkage stay 38D protrudes downwardly backward from the pivoting boss 38B. The second end of the linkage member 34 is connected to the second linkage stay 38D with a pivot shaft 43. In other words, the second end of the linkage member 34 is connected to the second linkage stay 38D below the pivoting boss 38B.

As shown in FIG. 3, when the clutch pedal 26 is pedaled forward (in the direction of the arrowed line X3) from the non-pedaling position P1, the interlocking linkage 37 is pushed forward (in the direction of an arrowed line X4), and the pivoting boss 38B is pivoted in the direction of an arrowed line X5. In this manner, the second linkage stay 38D pivots upward, then the linkage member 34 is pulled up in the direction of an arrowed line X6, and the clutch lever 21 is pulled up in the direction of the arrowed line X2 to disengage the clutch 12.

When the stepping force is released from the clutch pedal 26, the clutch pedal 26 returns to the non-pedaling position P1, and the interlocking linkage 37 is pulled backward. In this manner, the linkage member 34 is pushed down, and the clutch lever 21 is swung downward to engage the clutch 12.

According to the configuration mentioned above, the linkage member 34 and the intermediate linkage 38 are located on the vehicle body 2 side rather than the cabin 8 side, and the interlocking linkage 37 is configured to be pushed and pulled back and forth by the operation (swing) of the clutch pedal 26. Accordingly, even when the cabin 8 vibrates up and down with respect to the vehicle body 2 due to vibrations of the working vehicle 1 on rough roads, the vertical vibration of the cabin 8 can be suppressed or prevented from being propagated to the clutch 12. That is, since the interlocking linkage 37 is pushed and pulled back and forth by the operation of the clutch pedal 26 to engage and disengage the clutch 12, the interlocking linkage 37 is prevented or suppressed from moving back and forth due to the vertical vibration of the cabin 8, and thus the clutch 12 can be prevented from being engaged and disengaged due to the vibrations of the cabin 8. In this manner, the clutch judder phenomenon is able to be reduced or prevented.

As shown in FIG. 5, the support frame 41 includes a first side frame member 46, a second side frame member 47, an upper frame member 48, a lower frame member 49, and a connecting frame 50. The first side frame member 46 and the second side frame member 47 are longer in the vertical direction, and are spaced from each other in the vehicle width direction. The first side frame member 46 is located on the left side of the flywheel housing 3A, and defines the left portion of the support frame 41. The second side frame member 47 is located on the right side of the flywheel housing 3A, and defines the right portion of the support frame 41. The lower end of the first side frame member 46 is located higher than the lower end of the second side frame member 47, and the upper ends of the first side frame member 46 and the second side frame member 47 are located at the same or substantially the same height. The upper frame member 48 connects the upper ends of the first and second side frame members 46 and 47 to each other.

Figure 6:
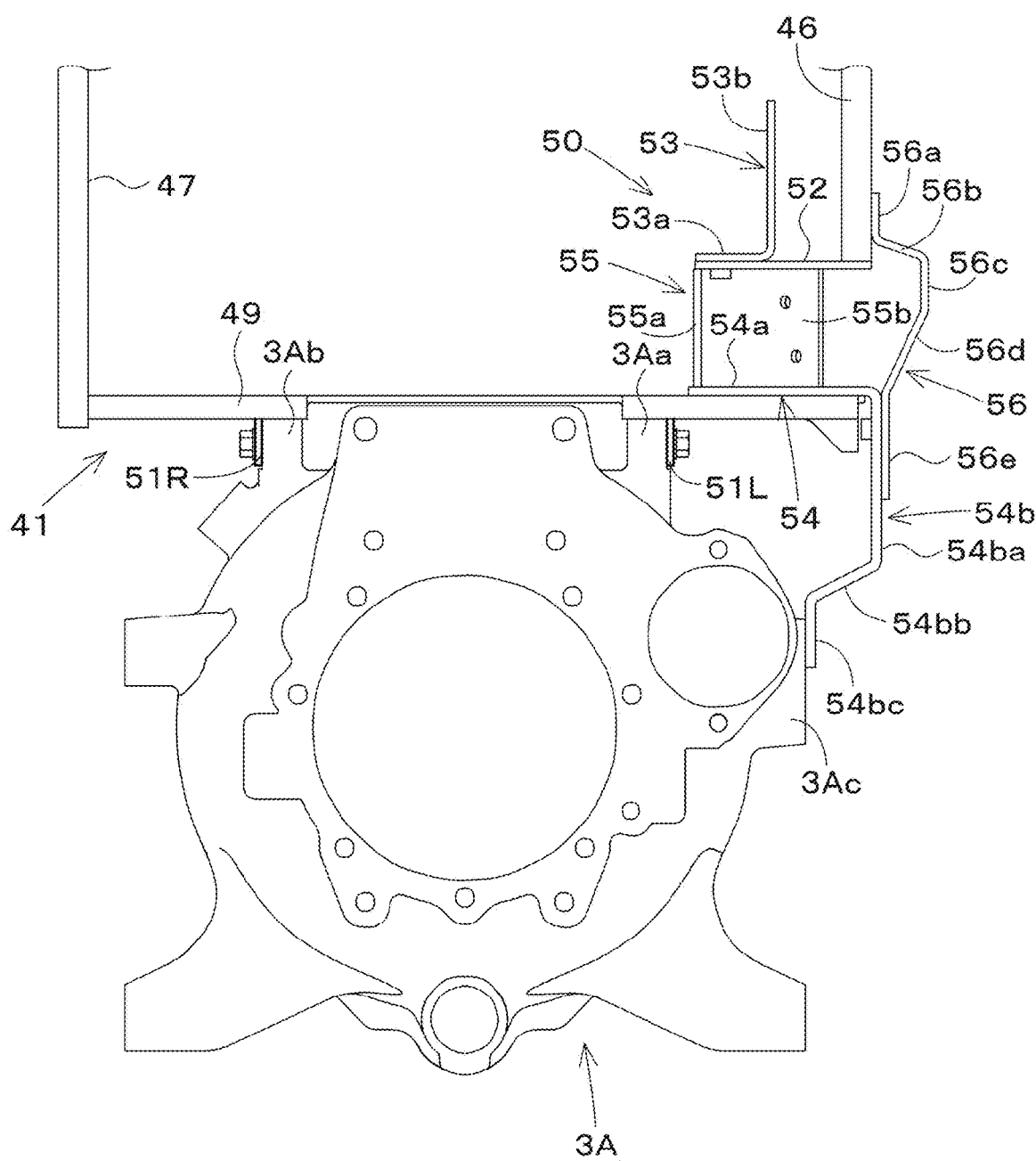
FIG. 6 is a front view of an attachment portion of a support frame.

As shown in FIG. 6, the lower frame member 49 is located on the upper side of the flywheel housing 3A, and extends from the lower position of the first side frame member 46 to the lower end portion of the second side frame member 47. The left portion of the lower frame member 49 is arranged below the first side frame member 46 with an interval, and is connected to the first side frame member 46 via the connecting frame 50. The right portion of the lower frame member 49 is connected to the lower end of the second side frame member 47. A plurality of attachment stays (in this preferred embodiment, a pair of first attachment stay 51L and second attachment stay 51R) are fixed to the lower side of the lower frame material 49 and protrude downward. The first attachment stay 51L is located on the left side of the upper portion of the flywheel housing 3A, and is fixed with a bolt to a first attachment portion 3Aa that is provided on the upper portion of the flywheel housing 3A. The second attachment stay 51R is located on the right side of the upper portion of the flywheel housing 3A, and is fixed with a bolt to the second attachment portion 3Ab that is provided on the upper portion of the flywheel housing 3A.

Figure 8:
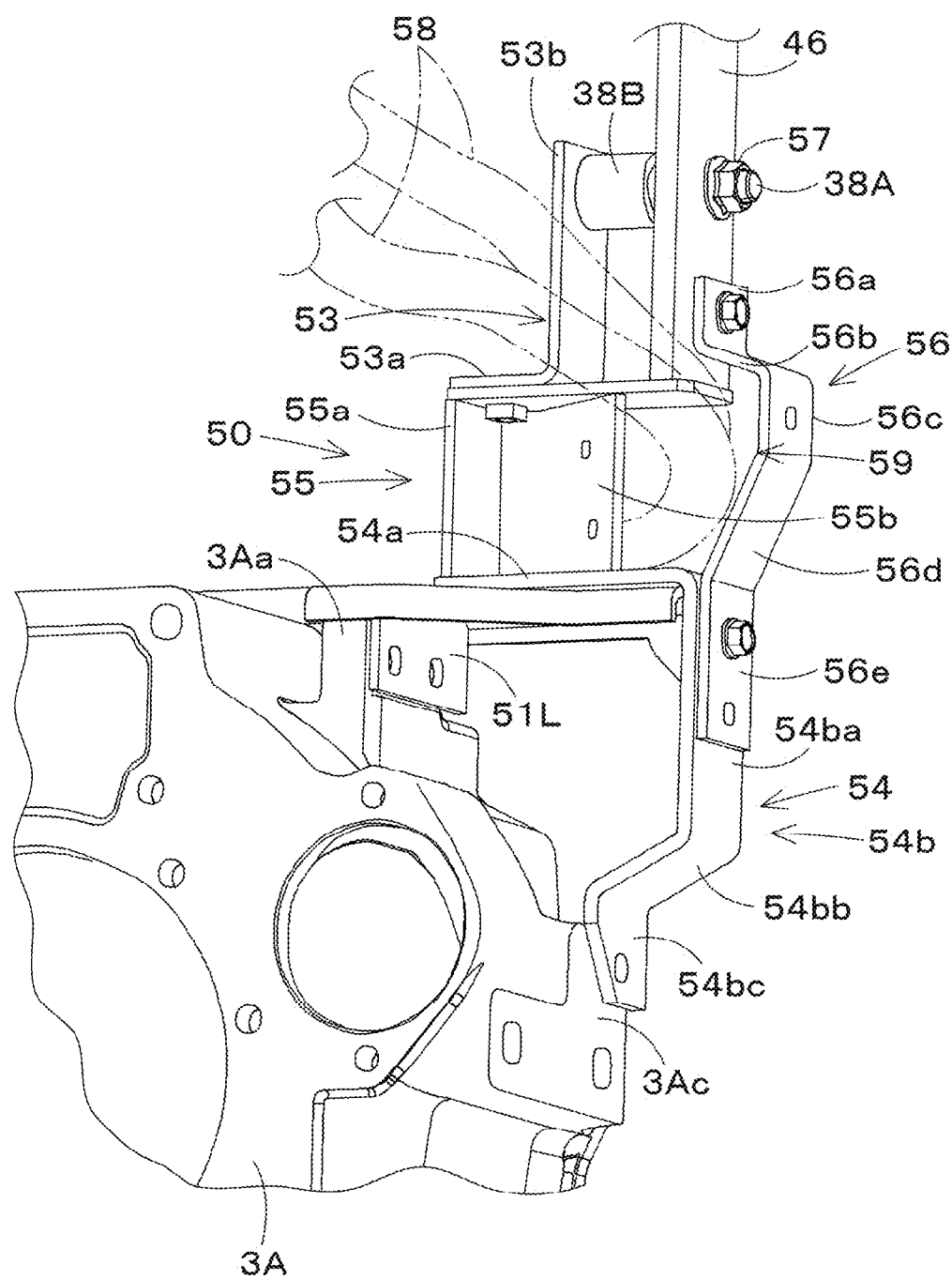
FIG. 8 is a perspective front view of a through portion of a wiring harness.

As shown in FIG. 6, FIG. 7 and FIG. 8, the connecting frame 50 includes a first member 52 to a fifth member 56. The first member 52 to the fifth member 56 are defined by plate members. The first member 52 is a plate member having a long length in the vehicle width direction, and is arranged to face its plate surfaces upward and downward. The first member 52 includes a left portion fixed to the lower end portion of the first side frame member 46, and protrudes rightward from the first side frame member 46. The second member 53 includes an attachment wall 53a fixed with a bolt on the right portion of the first member 52, and a support wall 53b extending upward from the left end of the attachment wall 53a.

As shown in FIG. 7, the support wall 53b and the lower portion of the first side frame member 46 are arranged with a clearance therebetween. A linkage support shaft 38A extends over the support wall 53b and the lower portion of the first side frame member 46. The right end of the linkage support shaft 38A is fixed to the support wall 53b, and the left end of the linkage support shaft 38A is attached to the first side frame member 46 with a nut 57. The pivoting boss 38B is provided on the outer periphery of the linkage support shaft 38A between the support wall 53b and the first side frame member 46. The second member 53 and the first side frame member 46 define an attachment portion to which the intermediate linkage 38 is attached.

As shown in FIG. 7, the third member 54 includes an upper wall 54a and a side wall 54b extending downward from the left end portion of the upper wall 54a. The upper wall 54a is stacked on and fixed to the upper surface of the left portion of the lower frame member 49. An upper portion 54ba of the side wall 54b extends vertically downward from the left end portion of the upper wall 54a. A middle portion 54bb of the side wall 54b extends from the lower end of the upper portion 54ba in an inclining direction that shifts downward as extending inward in the vehicle width direction. A lower portion 54bc of the side wall 54b extends vertically downward from the lower end of the middle portion 54bb. The lower portion 54bc of the side wall 54b is fixed with a bolt to a third attachment portion 3Ac provided at the vertically middle portion of the left side portion of the flywheel housing 3A. The clutch lever 21 extends from the front area of the side wall 54b to the rear area of the side wall 54b through a space on the right side of the vertically middle portion of the side wall 54b.

As shown in FIGS. 7 and 8, the fourth member 55 is located between the first member 52 and the upper wall 54a of the third member 54, and connects the first member 52 and the third member 54. The fourth member 55 includes a first portion 55a and a second portion 55b. The first portion 55a includes a plate surface facing the vehicle width direction, is located between the right end portion of the first member 52 and the right end portion of the upper wall 54a of the third member 54, and is fixed to these right end portions. The second portion 55b extends outward in the vehicle width direction (to the left) from the left end portion of the first portion 55a, then extends forwardly outward in the vehicle width direction, and is fixed to the first member 52 and the third member 54.

As shown in FIGS. 6 and 8, the fifth member 56 is located outward of the fourth member 55 in the vehicle width direction, and connects the lower portion of the first side frame member 46 to the upper portion of the third member 54. The fifth member 56 includes a first portion 56a, a second portion 56b, a third portion 56c, a fourth portion 56d, and a fifth portion 56e. The first portion 56a is fixed with a bolt to the left surface of the first side frame member 46. The second portion 56b extends outward in the vehicle width direction from the lower end of the first portion 56a. In particular, the second portion 56b extends from the lower end of the first portion 56a slightly downwardly outward in the vehicle width direction from the lower end of the first portion 56a. The third portion 56c extends downward from the left end of the second portion 56b. The fourth portion 56d extends from the lower end of the third portion 56c toward the third member 54. In particular, the fourth portion 56d extends downwardly inward in the vehicle width direction, i.e., downwardly rightward, from the lower end of the third portion 56c. The fifth portion 56e extends downward from the lower end of the fourth portion 56d, and is fixed with a bolt to the upper portion 54ba of the side wall 54b of the third member 54.

As shown in FIG. 2, a wiring harness (harness bundle) 58, which bundles electric wirings, extends from the interior side of the cabin 8 to the side where the prime mover E1 is located. As shown in FIG. 8, the connecting frame 50 includes a through portion 59 defined by the first member 52, the third member 54, the fourth member 55, and the fifth member 56. By passing the wiring harness 58 through the through portion 59, the wiring harness 58 can extend from the interior side of the cabin 8 to the side where the prime mover E1 is located. Since the fifth member 56 is fixed with a bolt to the first side frame member 46 and the third member 54, the through portion 59 is opened sideward (in this preferred embodiment, leftward) when the fifth member 56 is removed, and thus the wiring harness 58 can easily pass through the through portion 59.

As shown in FIG. 2, the working vehicle 1 is provided with a DPF (Diesel Particulate Filter) 60, which is an exhaust gas purification device, above the rear portion of the prime mover E1. The DPF 60 is a device configured to catch the PM (Particulate Matter) contained in the exhaust gas of the prime mover E1 and automatically burns the PM (the DPF regeneration).

Since the DPF 60 becomes hot, the wiring harness 58 needs to be kept away from the DPF 60. Locating the through portion 59 below the linkage support shaft 38A of the intermediate linkage 38 allows the wiring harness 58 to extend from the interior side of the cabin 8 to the side where the prime mover E1 is located while keeping the wiring harness 58 away from the DPF 60.

As a method of reducing or preventing the clutch judder phenomenon, a method is known that the clutch pedal 26 and the clutch lever 21 are interlocked with each other by a cable including an outer tube and an inner cable slidably inserted into the outer tube. However, the cable needs to be curved wide. In the working vehicle 1 according to the present preferred embodiment, since the brackets supporting the DPF 60, the hoses connected to the DPF 60, and the like are located above the clutch lever 21, no space can be provided for arrangement of the cable curved wide. In such a case, the configuration of the interlocking mechanism 33 mentioned above is effective in interlocking the clutch pedal 26 with the clutch lever 21.

Next, a configuration of the front portion of the hood 4 will be described.

Figure 9:
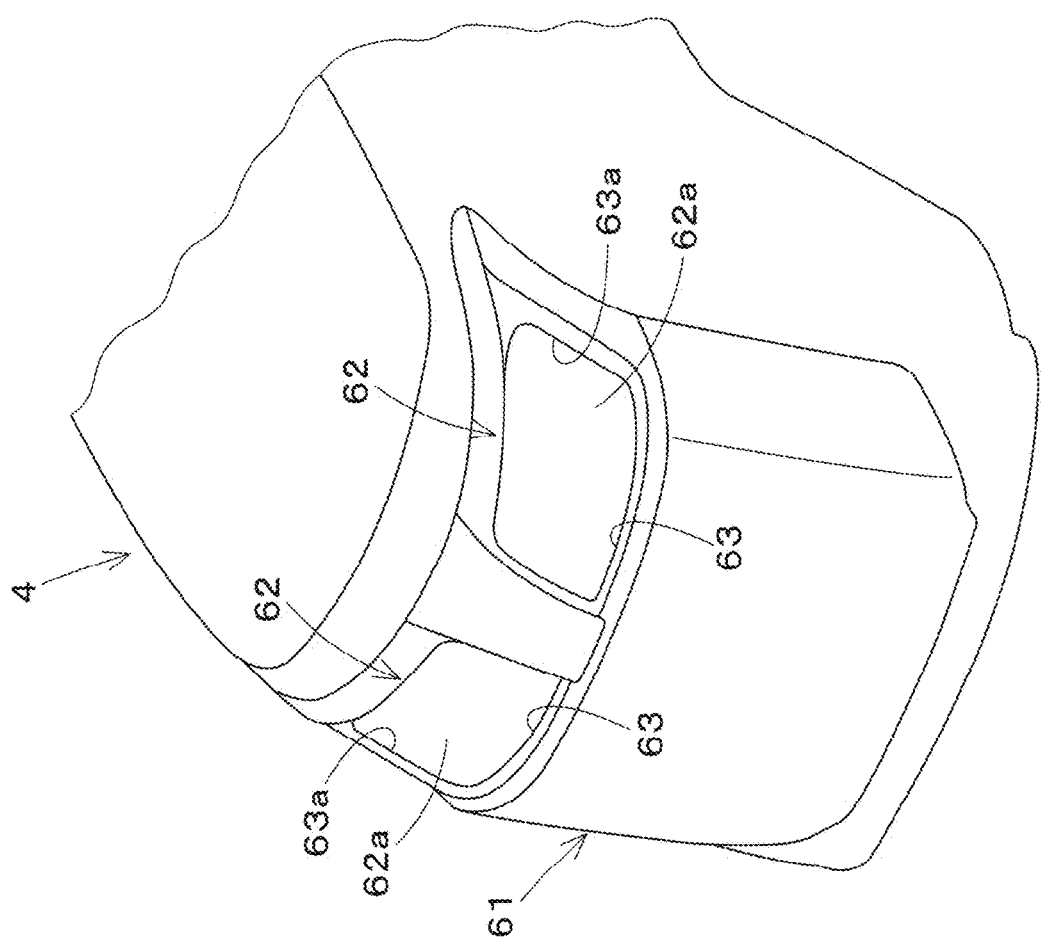
FIG. 9 is a perspective view of a front portion of a hood.

As shown in FIG. 9, the hood 4 includes, in the front portion, a front grille 61 made of resin, and a pair of headlights 62 attached to the front grille 61. The pair of headlights 62 are located on the back side of the front grille 61, and are attached to the front grille 61. The front grille 61 includes openings 63 at portions thereof corresponding to the headlights 62 so that lens portions 62*a* of the headlights 62 are disposed in the respective openings 63 to be exposed.

Figure 10:
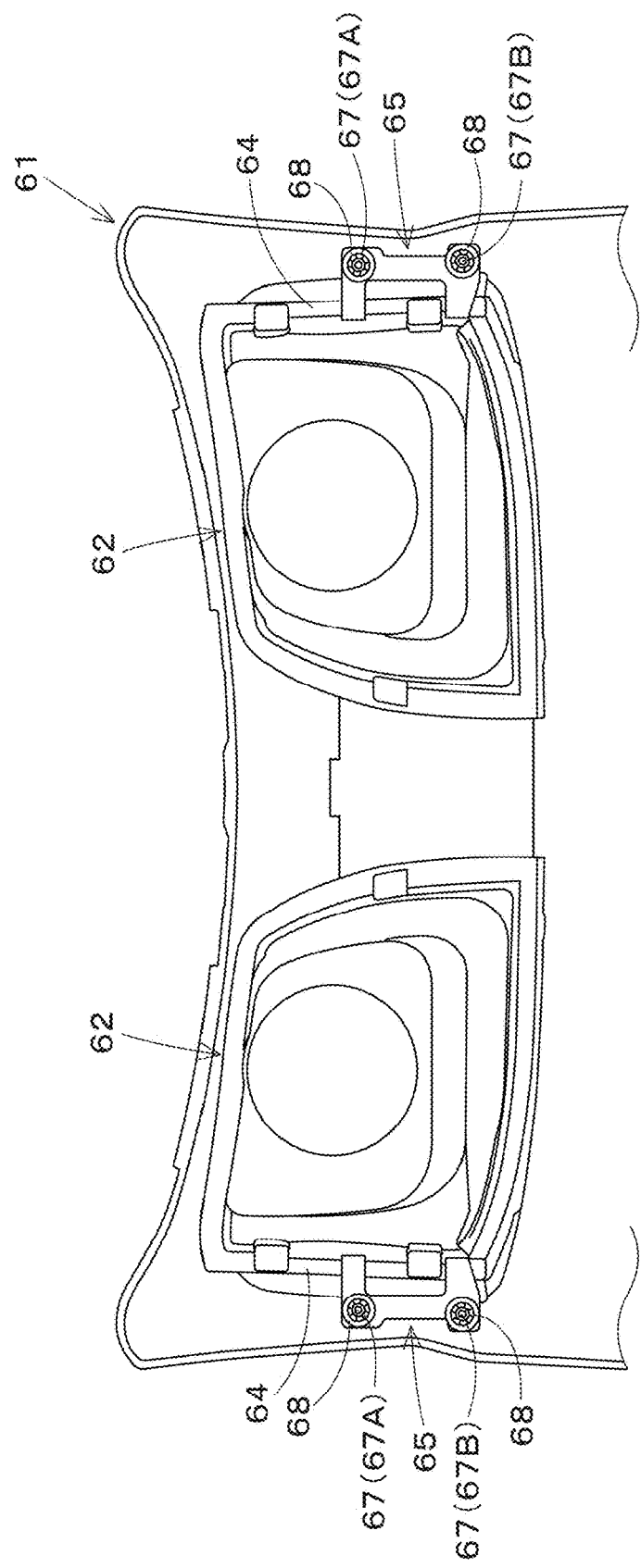
FIG. 10 is a back view of an upper portion of a front grille.

FIG. 10 shows a back view of the upper portion of the front grille 61. Engagement convex portions 64 are provided on the outer sides, in the vehicle width direction, of the backs of the headlights 62. In addition, stays 65 are located on the outer sides, in the vehicle width direction, of the backs of the headlight 62 to engage with the respective engagement convex portions 64.

Figure 11:
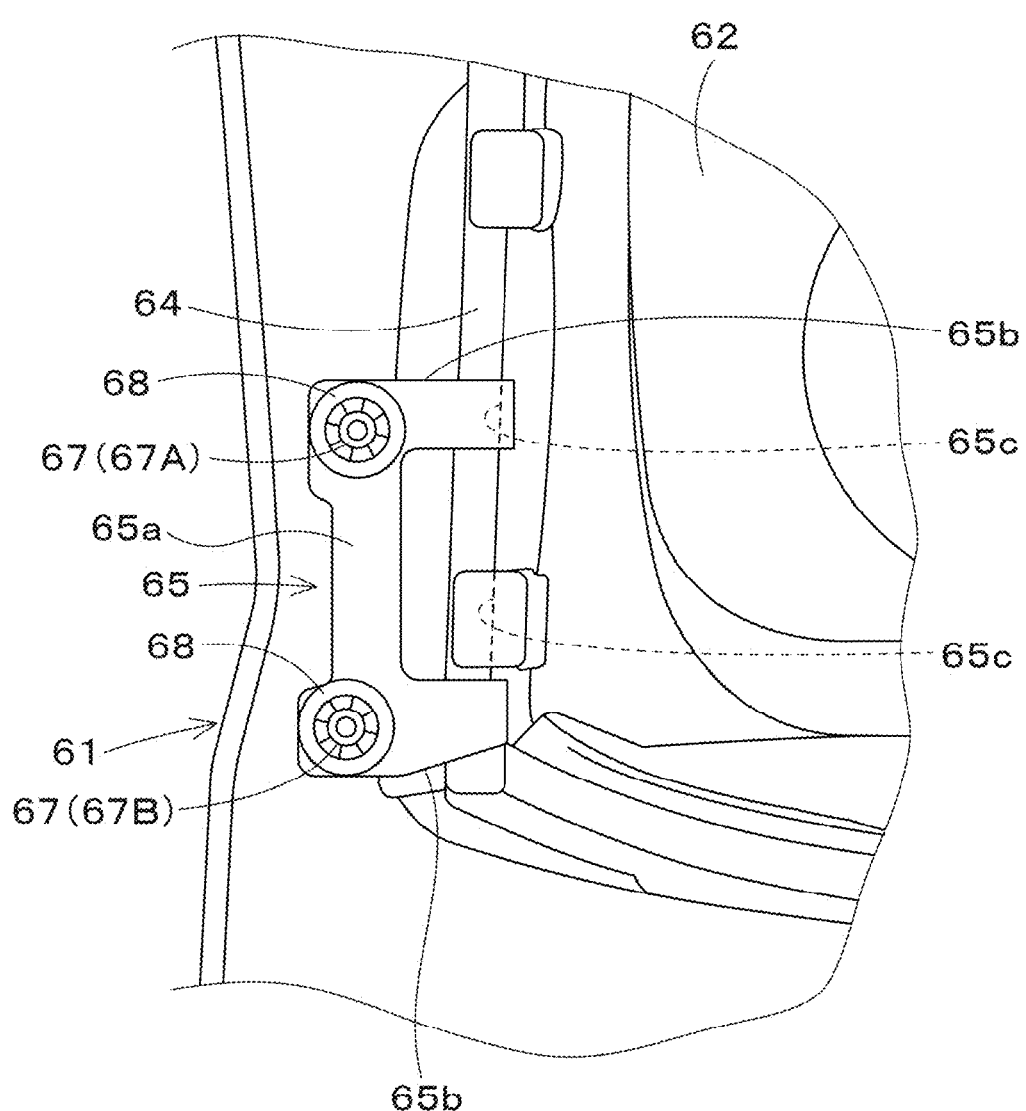
FIG. 11 is an enlarged view of a fixing portion of the front grille and a headlight.
Figure 12:
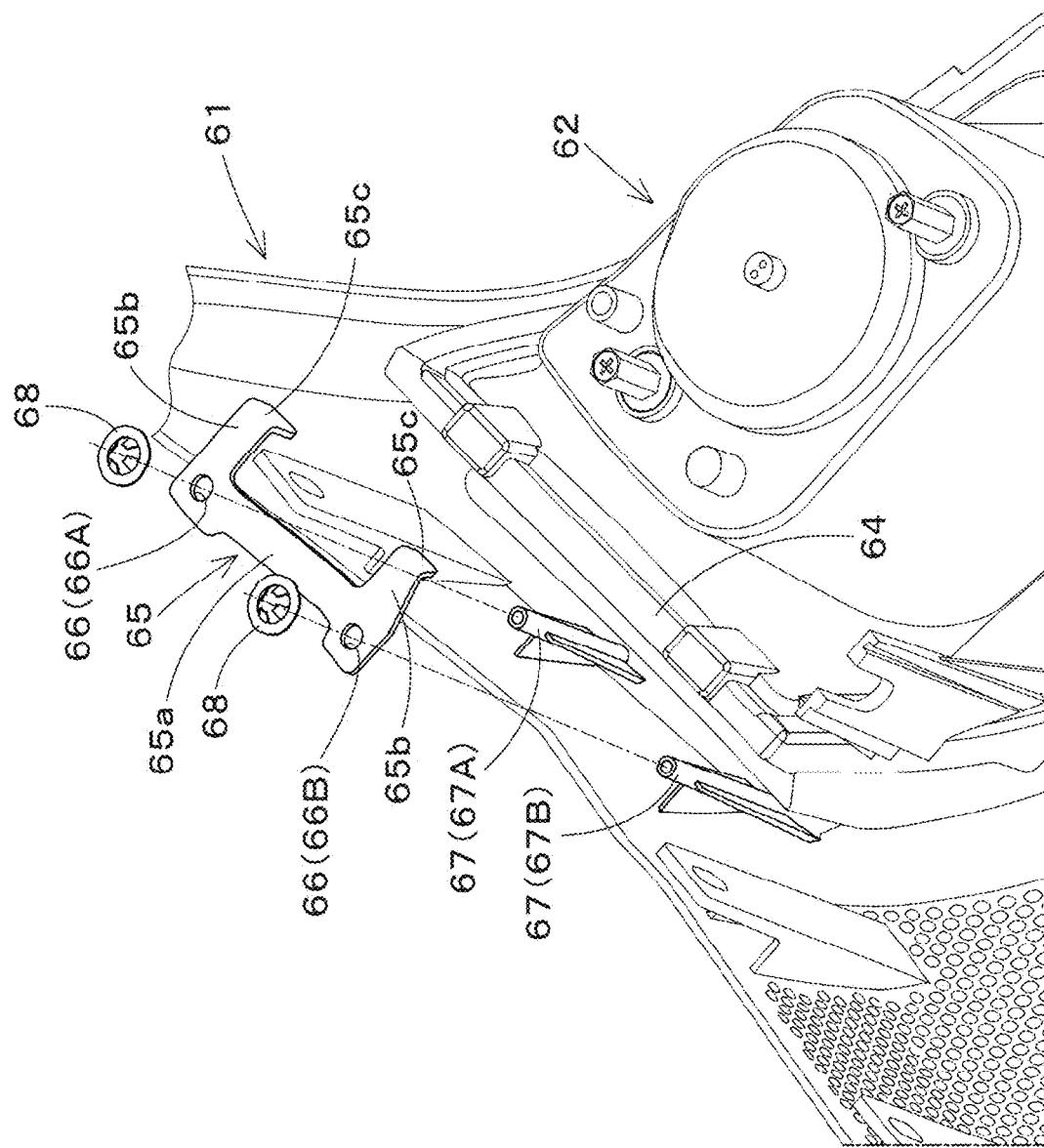
FIG. 12 is an exploded perspective view of the fixing portion of the front grille and the headlight.

As shown in FIGS. 11 and 12, each of the stays 65 includes a plate member, a base portion 65*a*, a plurality of extension portions 65*b* extending from the base portion 65*a*, and a hooking portion 65*c* on each of the extension portions 65*b*. The base portion 65*a* is located outward in the vehicle width direction from the engagement convex portion 64 and extends lengthwise along the engagement convex portion 64. Each stay 65 includes pin insertion holes 66 including upper and lower pin insertion holes 66A and 66B. The upper portion of the base portion 65*a* is penetrated by the upper pin insertion hole 66A, and the lower portion of the base portion 65*a* is penetrated by the lower pin insertion hole 66B. A plurality of extension portions 65*b* extend inward in the vehicle width direction from the upper and lower portions of the base portion 65*a*. Each of the hooking portions 65*c* extends forward from the inner end portion, in the vehicle width direction, of each of the extension portions 65*b*.

Figure 13:
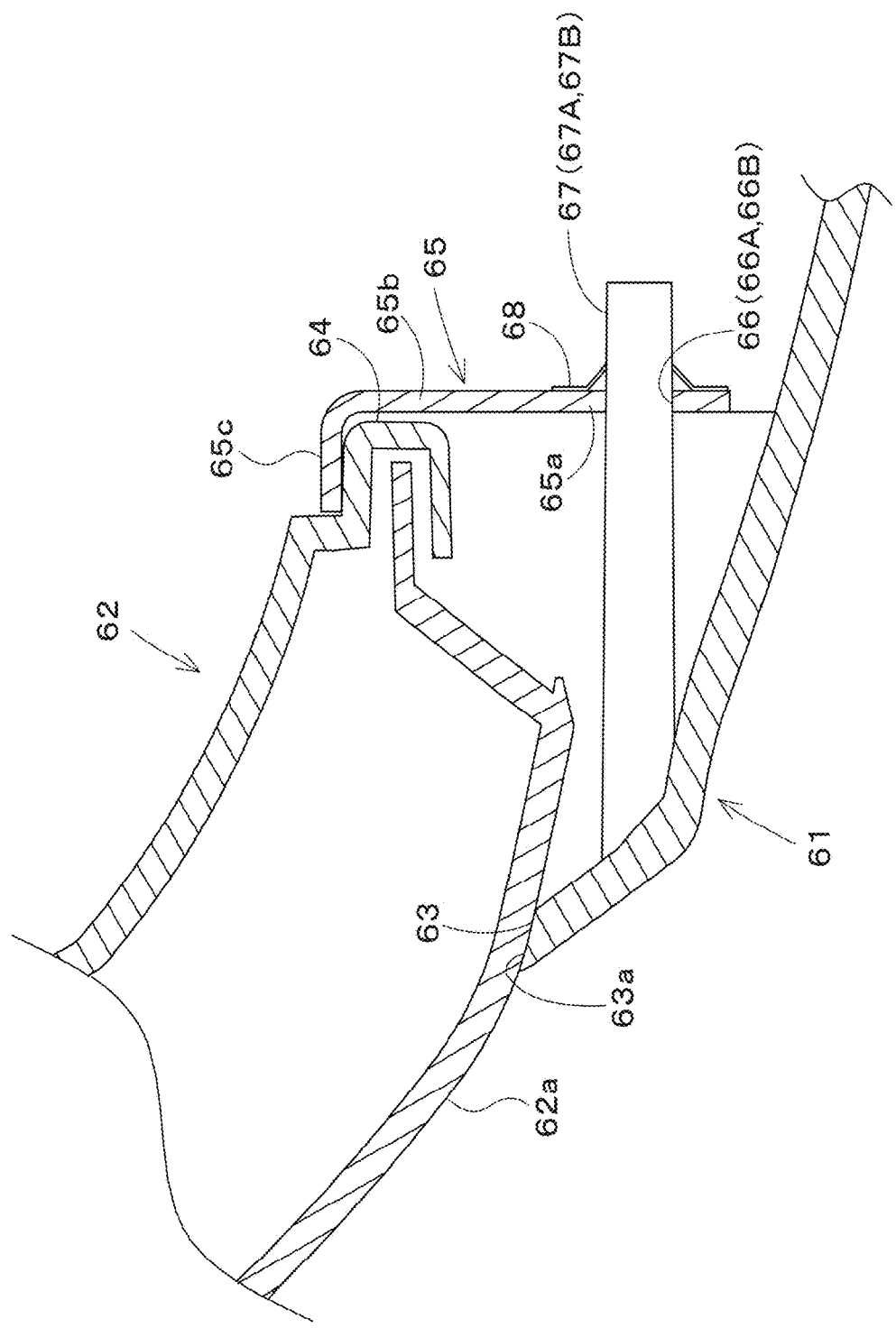
FIG. 13 is a cross-section view of the fixing portion of the front grille and the headlight.

As shown in FIGS. 12 and 13, pin-shaped portions (defining and functioning as engagement protrusions) 67 are each provided on the back of the front grille 61 outward in the vehicle width direction from each of the engagement convex portions 64. Each of the pin-shaped portions 67 includes an upper pin-shaped portion 67A, which is inserted through the upper pin insertion hole 66A, and a lower pin-shaped portion 67B, which is inserted through the lower pin insertion hole 66B.

The stays 65 are fitted and fastened to the respective pin-shaped portions 67 by speed nuts 68. In particular, each of the stays 65 includes the upper pin-shaped portion 67A inserted through the upper pin insertion hole 66A, the lower pin-shaped portion 67B inserted through the lower pin insertion hole 66B, and engages its upper and lower hooking portions 65*c* onto the inner side, in the vehicle width direction, of the corresponding engagement convex portion 64. The headlights 62 are fixed to the front grille 61 by fitting the speed nuts 68 onto the respective pin-shaped portions 67 inserted through the respective pin insertion holes 66. In this fixation, the front grille 61 is pulled toward the headlights 62 by the stays 65 so as to have no clearance between edge portions (specifically, edge portions on the outer side thereof in the vehicle width direction) 63*a* of the openings 63 and the headlights 62 (specifically, lens portions 62*a*).

To attach the headlights 62 to the front grille 61 made of resin in the hood 4, a sheet metal stay and bolts and nuts may be used so that the outer shapes of the headlights 62 match with the shapes of portions of the front grille 61 to surround the headlights 62. In this case, since the headlights 62 are assembled to the front grille 61 with the bolts, significant additional man-hours are required for the assembly. In addition, it is necessary to provide a space for tools in tightening the bolts, which limits the degree of freedom in the design of the front grille 61. Accordingly, a different assembly structure from the assembly using the bolts has to be devised.

In the present preferred embodiment, the front grille 61 made of resin is fixed to the headlights 62 while being pulled to the headlights 62 with the stays 65, thus eliminating a clearance between the outer shapes of the headlights 62 and the front grille 61 made of resin.

The pin-shaped portions 67 provided on the front grille 61 enable the stays 65 to be fixed with the speed nuts 68. That is, the number of assembly man-hours can be reduced by using the speed nuts 68 instead of bolts to fix the stays. In addition, when using the speed nuts 68, there is no need to consider the clearance for tools, and thus the design of the front grille 61 can be made more flexible.

The working vehicle 1 mentioned above includes the vehicle body 2, the cabin 8 mounted on the vehicle body 2, the clutch pedal 26 provided in the cabin 8, the clutch 12 provided on the vehicle body 2, the clutch operation member 19 to engage and disengage the clutch 12, the linkage member 34 including first and second ends, the first end of the linkage member 34 being connected to the clutch operation member 19, and the interlocking linkage mechanism 35 to interlock the clutch pedal 26 with the second end of the linkage member 34 so that vibrations of the cabin 8 is suppressed or prevented from transmitting to the clutch 12.

The providing of the interlocking linkage mechanism 35 prevents or suppresses the clutch judder phenomenon.

In addition, the interlocking linkage mechanism 35 includes the interlocking linkage 37 including first and second ends, the first end of the interlocking linkage 37 being connected to the clutch pedal 26, and the intermediate linkage 38 to interlock the linkage member 34 with the second end of the interlocking linkage 37. The interlocking linkage 37 is pushed and pulled back and forth due to operation of the clutch pedal 26.

According to this configuration, since the interlocking linkage 37 is pushed and pulled back and forth by the operational swing movement of the clutch pedal 26, the interlocking linkage 37 is suppressed or prevented from being pushed and pulled to suppress or prevent the clutch judder phenomenon even when the cabin 88 vibrates up and down with respect to the vehicle body 22 due to the vibrations of the working vehicle 1 traveling on a rough road or the like.

In addition, the intermediate linkage 38 includes the linkage support shaft 38A provided on the vehicle body 2, the pivoting boss 38B rotatably provided on the linkage support shaft 38A, and the first linkage stay 38C fixed to the pivoting boss 38B and connected to the second end of the interlocking linkage 37.

This configuration enables the interlocking linkage 37 to be pushed and pulled back and forth by the operation of the clutch pedal 26.

In addition, the clutch pedal 26 includes the pedal arm 26A including an upper portion pivotally supported by the pedal shaft 29a provided in the cabin 8. The first linkage stay 38C protrudes upward from the pivoting boss 38B. The interlocking linkage 37 includes first and second ends, the first end of the interlocking linkage 37 being connected to the pedal arm 26A below the pedal shaft 29a, and the second end of the interlocking linkage 37 being connected to the first linkage stay 38C above the pivoting boss 38B.

According to this configuration, the clutch judder phenomenon due to the clutch pedal 26 having a suspended configuration is suppressed or prevented.

In addition, the intermediate linkage 38 includes the second linkage stay 38D protruding downward from the pivoting boss 38B, and the second end of the linkage member 34 is connected to the second linkage stay 38D below the pivoting boss 38D.

According to this configuration, the pushing and pulling motion back and forth of the interlocking linkage 37 can be transmitted to the linkage member 34.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a vehicle body;
   a cabin mounted on the vehicle body with one or more anti-vibration mounts;
   a pedal shaft provided in the cabin;
   a clutch pedal pivotally supported by the pedal shaft;
   a clutch provided on the vehicle body;
   a clutch operator to engage and disengage the clutch;
   a linkage including first and second ends, the first end of the linkage being connected to the clutch operator;
   a linkage lock to interlock the clutch pedal with the second end of the linkage so that vibrations of the cabin are reduced or prevented from being transmitted to the clutch; and
   a support frame disposed forward of the cabin and attached to the vehicle body, wherein
   the clutch pedal includes:
      a pedal arm extending lengthwise in a vertical direction and having an upper portion pivotally supported by the pedal shaft,
      a pedaling member fixed to a lower portion of the pedal arm, and
      a connecting stay disposed on a side of the upper portion of the pedal arm and fixed to the pedal arm,
   the linkage lock includes:
      an interlocking linkage having a rear end pivotally supported on the connecting stay at a position lower than the pedal shaft and rearward of the upper portion of the pedal arm, the interlocking linkage extending downwardly forward from the connecting stay, and
      an intermediate linkage to interlock the linkage with a front end of the interlocking linkage, and
   the intermediate linkage includes:
      a linkage support shaft attached to the support frame,
      a pivoting boss rotatably provided on the linkage support shaft,
      a first linkage stay fixed to an upper portion of the pivoting boss such that the first linkage stay protrudes upward and pivotally supporting the front end of the interlocking linkage, and
      a second linkage stay fixed to a lower portion of the pivoting boss such that the second linkage stay protrudes downward and pivotally supporting the second end of the linkage.

2. The working vehicle according to claim 1, wherein:
   the support frame includes:
      a first side frame member and a second side frame member which are spaced from each other in a vehicle width direction,
      a lower frame member attached to the vehicle body and having the second side frame member connected thereto, and
      a connecting frame connecting the first side frame member to the lower frame member,
   the connecting frame includes:
      a first member having fixed thereto a lower end portion of the first side frame member, and
      a second member attached to the first member and includes a support wall that is spaced from a lower portion of the first side frame member, and
   the linkage support shaft extends over the support wall and the first side frame member.

3. The working vehicle according to claim 2, wherein the pivoting boss is provided on an outer periphery of the linkage support shaft between the support wall and the first side frame member.

4. The working vehicle according to claim 2, wherein the connecting frame includes a through portion for passage of a wire harness from an interior side of the cabin to an area forward of the support frame.

5. The working vehicle according to claim 4, wherein:
   the connecting frame includes:
      a third member connecting the lower frame member and the vehicle body,
      a fourth member located between the first member and the third member and connecting the first member and the third member, and
      a fifth member located outward of the fourth member in the vehicle width direction and connecting the lower portion of the first side frame member and the third member, and
   the through portion is defined by the first member, the third member, the fourth member, and the fifth member.

* * * * *